US006868956B2

(12) United States Patent
Hauer et al.

(10) Patent No.: US 6,868,956 B2
(45) Date of Patent: Mar. 22, 2005

(54) FOOTBOARD ELEMENT FASTENING FOR PASSENGER CONVEYORS

(75) Inventors: Uwe Hauer, Nienburg (DE); Andreas Stuffel, Porta Westfalica (DE); Joerg Ostermeier, Bueckeburg (DE); Dietmar Thaler, Seggebruch (DE); Andreas Vogt, Woelpinghausen (DE)

(73) Assignee: Otis Elevator Company, Farmington, CT (US)

( * ) Notice: Subject to any disclaimer, the term of this patent is extended or adjusted under 35 U.S.C. 154(b) by 20 days.

(21) Appl. No.: 10/432,650

(22) PCT Filed: Nov. 15, 2001

(86) PCT No.: PCT/US01/45523

§ 371 (c)(1), (2), (4) Date: May 28, 2003

(87) PCT Pub. No.: WO02/44072

PCT Pub. Date: Jun. 6, 2002

(65) Prior Publication Data

US 2005/0000778 A1 Jan. 6, 2005

Related U.S. Application Data

(63) Continuation of application No. 09/724,090, filed on Nov. 28, 2000, now Pat. No. 6,450,316.

(30) Foreign Application Priority Data

Feb. 8, 2001 (DE) ........................................ 101 05 690

(51) Int. Cl.[7] ................................................ B65G 23/12

(52) U.S. Cl. ........................ 198/333; 198/327; 198/326

(58) Field of Search ................................ 198/326, 327, 198/333

(56) References Cited

U.S. PATENT DOCUMENTS

| | | | | |
|---|---|---|---|---|
| 2,292,534 A | | 8/1942 | Marqles | |
| 3,789,972 A | * | 2/1974 | Kraft | 198/330 |
| 5,944,164 A | * | 8/1999 | Behle | 198/333 |
| 6,450,316 B1 | * | 9/2002 | Stuffel et al. | 198/326 |

FOREIGN PATENT DOCUMENTS

| | | |
|---|---|---|
| DE | 2346266 A | 3/1975 |

* cited by examiner

*Primary Examiner*—James R. Bidwell

(57) ABSTRACT

A passenger conveyor (2) contains an endless passenger conveyor belt (6) that is composed of several interconnected footboard elements (4), wherein the footboard elements (4) are respectively connected to transport chains (8) that are arranged laterally of the footboard elements and driven around a first and a second reversing point by means of a drive. This passenger conveyor is characterized by the fact that the footboard elements (4) are detachably connected to the transport chains (8) by means of one respective lateral holding device (34).

18 Claims, 4 Drawing Sheets

Figure 3B:
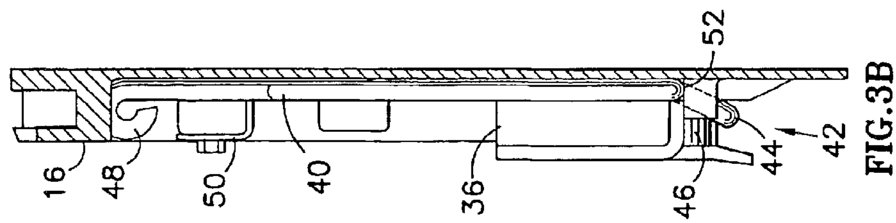

FIG.1
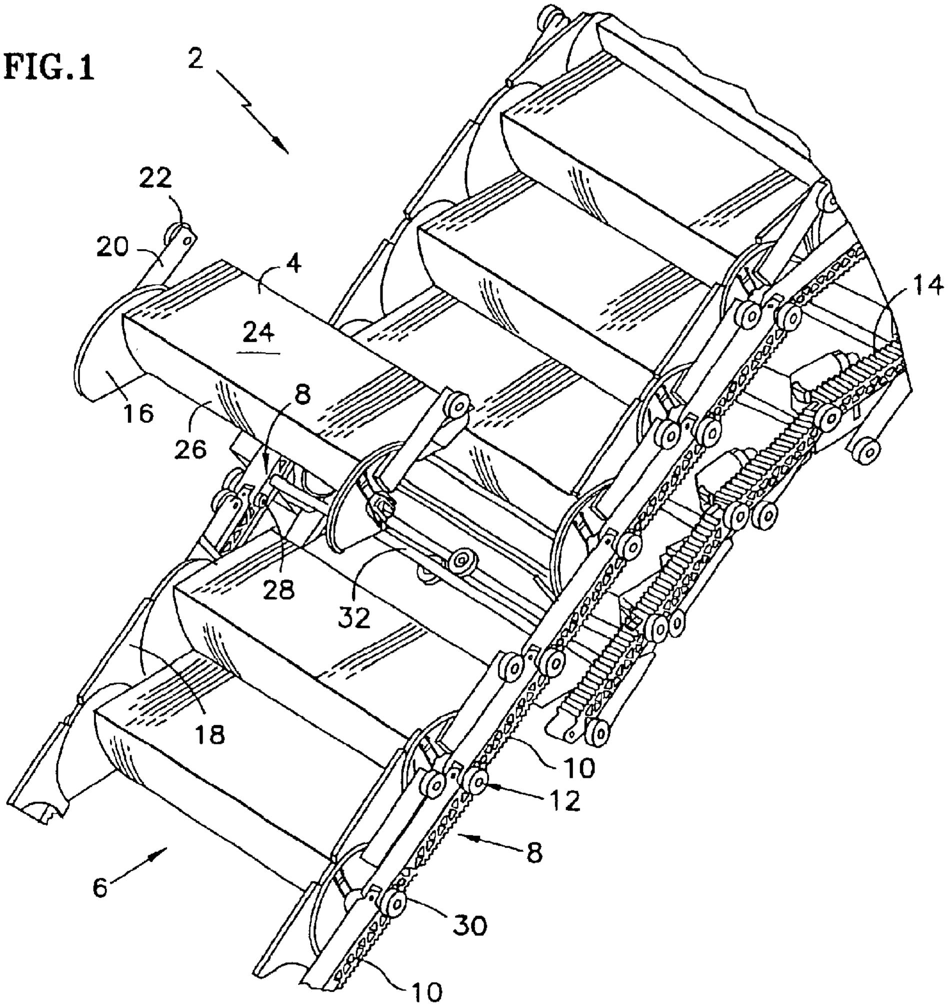
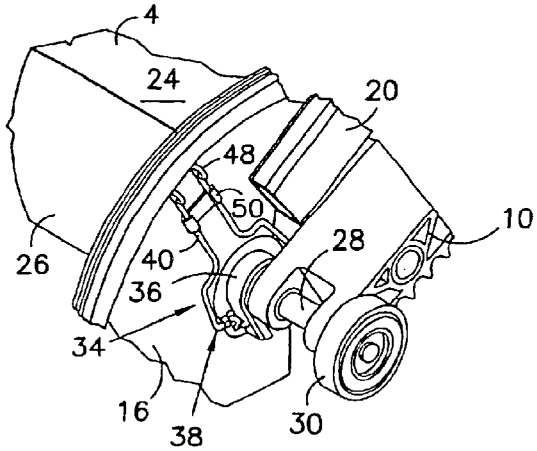
FIG.2

FOOTBOARD ELEMENT FASTENING FOR PASSENGER CONVEYORS

This application is a 371 of PCT/US01/45523 filed Nov. 15, 2001, which is a con of Ser. No. 09/724,090 filed Nov. 28, 2000, now U.S. Pat. No. 6,450,316.

The present invention pertains to a passenger conveyor with an endless passenger conveyor belt that is composed of several interconnected footboard elements, wherein the footboard elements are respectively connected to transport chains that are arranged laterally of the footboard elements and driven around a first and a second reversing point by means of a drive.

Escalators and moving sidewalks are typical examples of such passenger conveyors. An escalator usually contains a series of movable interconnected footboard elements that are referred to as "stairs" and driven around upper and lower chain reversing wheels by a driving motor. These interconnected stairs are referred to as a passenger conveyor belt or stair belt. Similarly, moving sidewalks contain several interconnected palette bodies that are also driven such that they revolve around two chain reversing wheels. In moving sidewalks of this type, the passenger conveyor belt is usually referred to as a palette belt.

The drive of such passenger conveyors is usually constructed in the form of a driving motor that drives the respective chain reversing wheels on one end of the passenger conveyor. In escalators, the driving motor usually drives the upper chain reversing wheels. However, alternative drive concepts are also known in which linear drives that, for example, act upon the transport chain are used for driving the passenger conveyor.

One embodiment of such a linear drive utilizes a special transport chain, the chain links of which are provided with a toothing, and a linear drive with a revolving drive belt that also contains teeth and cooperates with the toothing of the drive chain. Other types of drives are also known, for example, conductive drives in which the drive chain forms the movable part of the linear motor. The general advantage of linear drives can be seen in the fact that a series of smaller driving motors can be distributed over the entire transport path instead of having to arrange one large driving motor in the entry or exit region of the passenger conveyor. This allows a more compact design of the passenger conveyor. Another advantage is that a linear motor has a uniform drive characteristic independent of the length of the chain links and the size of the chain driving wheel.

In instances in which the drive of the passenger conveyor belt is not constructed with the aid of a chain reversing wheel, it is, for example, possible to provide a reversing plate or an essentially semicircular guideway that follows the guideways of the transport chain rollers and in which the transport chain rollers are reversed from the forward moving direction to the backward moving direction of the passenger conveyor. In this context, the term reversal covers all possible types of constructions, for example, chain reversing wheels, reversing guideways or reversing plates.

When servicing passenger conveyors, in particular, passenger conveyors with linear drives that are distributed over the transport path, one regularly encounters the problem that one or more footboard elements need to be removed from the passenger conveyor belt at some point on the transport path. Since passenger conveyors are generally designed such that the footboard elements can be removed relatively easily in the reversing region (due to the small reversing radius, the footboard elements are pivoted relative to one another to such a degree that a gap of sufficient width for reaching in and detaching a footboard from the chain is created between two footboard elements), the customary procedure in such instances is carried out as follows: the passenger conveyor is displaced until the footboard element to be removed is situated in the reversing region. Subsequently, the footboard element(s) in question is/are removed, whereafter the passenger conveyor is displaced again such that the gap in the passenger conveyor belt is situated above the desired point of repair. In passenger conveyors with linear drives, the complexity of this procedure is occasionally compounded by the problem that a defect of only one of the linear drives makes it impossible to displace the passenger conveyor belt unless one is willing to risk additional damage to the system.

Consequently, the present invention is based on the objective of making available a passenger conveyor of the initially described type in which the footboard elements can be detached from the passenger conveyor belt at any location between the two reversing points with simple means and without having to displace the passenger conveyor belt.

According to the invention, this objective is attained due to the fact that the footboard elements are detachably connected to the transport chains by means of one respective lateral holding device.

Until now, the customary mounting of footboard elements on the lateral transport chains was realized by means of a connecting axle that continuously extends between the two lateral stair chains. Two displaceable fastening bushings are arranged on the connecting axle. The footboard element has an essentially box-shaped design, wherein the underside, i.e., the side situated opposite to the step, is open. The footboard elements are fastened to the connecting axle within the region of the sidewalls. The side walls contain receptacle lugs with a diameter that corresponds to the outside diameter of the fastening bushing, as well as an opening that points downward, i.e., in the direction away from the step. This opening is sufficiently large for the connecting axle, but not for the fastening bushings. The footboard element is fastened by placing the footboard element onto the connecting axle in such a way that the connecting axle is situated in the fastening lug, whereafter the fastening bushing is laterally displaced into the fastening lug. A securing element holds the fastening bushing in position and prevents the footboard element from separating from the connecting axle. Due to the limited space available towards the transport chain, it is necessary to displace the fastening bushing inward in order to remove the footboard element. This can only be achieved without major problems in the region of the chain reversing wheel.

In another known fastening arrangement, a non-continuous stub axle is provided on a pivot between two chain links, wherein the stub axle contains a projecting step and a screw thread on its free end that protrudes under the footboard element. A fastening recess, through which the threaded end of the stub axle protrudes inward underneath the footboard element, is arranged in the side wall of the footboard element. A fastening nut clamps the footboard element wall against the projecting shoulder. These stairs—at least the first stair—can only be detached in the reversing region.

In contrast to arrangements of this type, the term "lateral holding device" refers to a holding device, the elements of which actually are situated essentially between the side wall of the footboard element and the transport chain, wherein the side wall and the transport chain can also form part of this region. This term is not meant to include holding devices in which a continuous connecting axle is provided between the two transport chains as part of the holding device. The advantage of fastening the footboard element on the chain links by means of a separate lateral holding device instead of a continuous connecting axle can be seen in the fact that only the former arrangement makes it possible to fasten the fastening element in an encompassing fashion by simply attaching the footboard element onto the fastening element. In this case, the parts of the holding device which ultimately serve for realizing the encompassing fastening are laterally guided past the (non-continuous) fastening element during the aforementioned attachment.

In such a passenger conveyor with lateral holding devices for the footboard elements, it is possible to remove individual footboard elements at any point of the transport path, for example, after gaining access to the lateral holding devices by removing the lateral covers. This method of fastening the footboard element is particularly preferred in modem passenger conveyors in which an upwardly extending flange is provided laterally on the footboard elements for safety reasons so as to prevent a relative movement between the footboard elements and the bottom paneling, in particular, in escalators. Such a relative movement tends to pull objects or body parts into the gap between the footboard element and the bottom paneling. The lateral flange is connected to the footboard elements or the transport chains, respectively, and disappears under a stationary cover in the top region. The gap between the stationary cover and the lateral flange of the footboard elements is far less critical than the gap between the footboard elements and the bottom paneling. When servicing passenger conveyors of this type, it is usually required to either remove the upper cover or the flange. This means that access can be gained to the lateral holding device in a relatively simple fashion in both instances.

The lateral holding device preferably consists of a separable rapid-action fastener. It is particularly preferred to utilize a rapid-action fastener that does not contain any loose parts and can be actuated without a tool. Due to these measures, the risk of any objects falling into the passenger conveyor, in particular, during the final assembly, is significantly minimized.

The rapid-action fastener preferably contains a holding spring. In comparison to other fastening methods, for example, by means of screws, a spring provides significant advantages. For example, it is impossible to undertighten or overtighten a holding spring. The holding spring can be fastened to the holding device in such a way that it can be removed quite easily. In addition, the function of a holding spring can be monitored much easier than that of a screw. The holding spring may also be designed such that it can be actuated without a tool.

The holding device preferably contains a pocket-like receptacle element, an engaging element that is designed to be accommodated in the receptacle element and a locking device that fixes the engaging element in the receptacle element. The pocket-like receptacle element may, for example, be arranged on one side wall of the box-shaped footboard element. The receptacle element may be constructed integrally with the side wall or fastened thereon. It would also be conceivable to arrange the pocket-like receptacle element on the transport chain. In addition, an engaging element is provided which can be inserted into the pocket-like receptacle of the receptacle element. The engaging element may, for example, consist of a simple hook or an element that is widened on its front end.

The engaging element preferably consists of an engaging bolt with a thickening on its free end.

The thickening on the free end of the engaging bolt preferably consists of a pivot bearing. The pivot bearings may consist of a sliding bearing, a rolling bearing or any other type of bearing that preferably contains an inner race which is fixed on the free end of the engaging bolt and an outer race which fits into the pocket-like receptacle of the receptacle element.

The pocket-like receptacle element is preferably arranged on the footboard element, and the engaging element is arranged on the transport chain.

The passenger conveyor is preferably constructed in the form of an escalator with a stair belt, wherein the stair belt respectively contains one step and one riser, and wherein the receptacle element is arranged in the region of the riser, preferably at approximately half its height. In an escalator, the step represents the surface on which the passengers stand, and the riser represents the front side that connects the step of a lower stair to the step of the next higher stair. Since the riser consists of the front wall of the box-like footboard element, it is apparent that the stair body is particularly stable in the region of the riser due to this wall element. Generally speaking, it is desirable to introduce forces into the stair exactly in this region. In contrast to prior solutions in which the forces are rather introduced in the region of the stair side walls, this makes it possible to achieve a significantly simpler and more compact construction, in particular, because additional reinforcements of the footboard element for realizing the connection on the stair chain are not required. In moving sidewalks, it is also preferred to introduce the forces into the palette body in the region of the front wall (or, if applicable, also the rear wall).

The transport chain is preferably composed of a series of chain links that are connected to one another at pivots, wherein an engaging bolt is preferably arranged at one of the pivots. This construction makes it possible to simultaneously utilize the connecting bolt between two chain links as the engaging bolt for the lateral holding device. This allows a particularly simple construction with only a few individual parts. Alternatively, it would also be conceivable to arrange the fastening bolt on the chain link at a different location.

The locking device preferably consists of a holding spring. It is also preferred that the holding spring is rotatably fastened on the receptacle element in such a way that the two free ends of the holding spring essentially protrude upward and away from the transport chain in the installed state such that the repair personnel do not have to reach down into the passenger conveyor quite as deep when servicing the passenger conveyor. The holding spring may, for example, consist of a spring wire material. The holding spring may, for example, be rotatably fastened on the pocket-like receptacle element in such a way that an outward pivoting of the two free ends of the holding spring away from the footboard element causes an inward pivoting of the central region of the spring in the direction underneath the footboard element. Due to this pivoting motion, the central region of the spring which is arranged opposite of the two free ends relative to the pivot of the spring can be pivoted out of the region of the engaging bolt in order to install and detach the footboard element.

The passenger conveyor is preferably constructed in the form of an escalator in which the stair position is controlled in the forward moving region by means of a stair roller. In this case, the stair roller is guided above the stair chain in a guideway. In escalators, stair rollers are used for holding the stair horizontally in the passenger conveying region, i.e., in the forward moving region of the passenger conveyor, and in particular, for also maintaining this horizontal position in the transition regions. When detaching footboard elements, these stair rollers frequently represent obstructions. Consequently, it is necessary to detach either the stair rollers or the guideway for the stair rollers. This is particularly problematic if the guideway for the stair roller extends underneath the guideway for the transport chain. Alternatively, it may be possible to "thread out" the stair roller by laterally turning the footboard element.

In this case, it is particularly preferred that the guideway is arranged on a part of the balustrade paneling which is removed when the footboard elements are detached. As mentioned above, part of the cover or balustrade paneling is advantageously removed in order to detach the footboard elements at an arbitrary point of the transport path. If the corresponding guideway for the stair roller is situated on the unexposed inner side of the balustrade paneling, it is not necessary to separately remove the stair roller or the guideway, respectively, such that the expenditure of labor for servicing a construction of this type is significantly reduced. The guideway typically consists of a running rail on which the stair roller runs and a counter rail that is situated above the stair roller and prevents the stair roller from moving upward. The running rail may, for example, be arranged on the frame of the passenger conveyor together with the guideway for the chain rollers. The counter rail may be fastened to the cover or the balustrade paneling such that the stair rollers can be moved upward after the balustrade paneling (or the cover) is removed.

The transport chains are preferably composed of a series of chain links that are connected to one another at pivots, wherein the partition ratio between the transport chain and the passenger conveyor belt is 1:1, i.e., one footboard element is connected to each chain link of a transport chain, and wherein two chain links of the transport chains which are positioned identically relative to the footboard element are preferably connected to one another laterally of this footboard element by means of a continuous axle that is rigidly fastened to the chain links between the two pivots. A transverse connection is provided within regular distances between the two transport chains, in particular, for stability reasons. In passenger conveyors that are available on the market so far, these connecting axles are arranged at the pivots of the chain links, i.e., the outer ends of each connecting axle simultaneously form the connecting bolt for the transport chain. The disadvantage of such a construction can be seen in the fact that the connecting axles need to be constructed to be divisible in order to make it possible to detach the transport chains at an arbitrary point of the transport path. For example, U.S. Pat. No. 4,232,786 describes a pair of transport chains with continuous connecting axles at the pivots. In order to allow the detachment of such transport chains at an arbitrary point of the transport path, at least part of the connecting axles, as well as the individual chain links, are constructed divisible in this particular construction. If the transport chain needs to be detached, the maintenance personnel has to handle many individual parts of the chain and the connecting axle which need to be connected to one another.

Figure 3A:
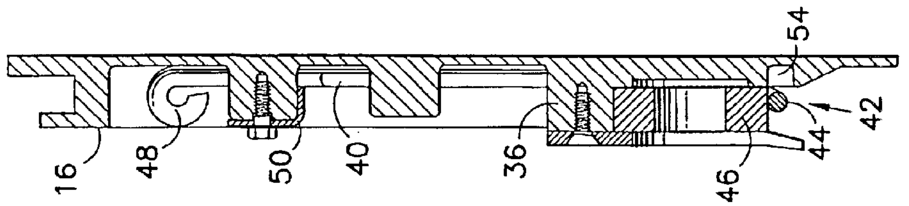
Figure 3:
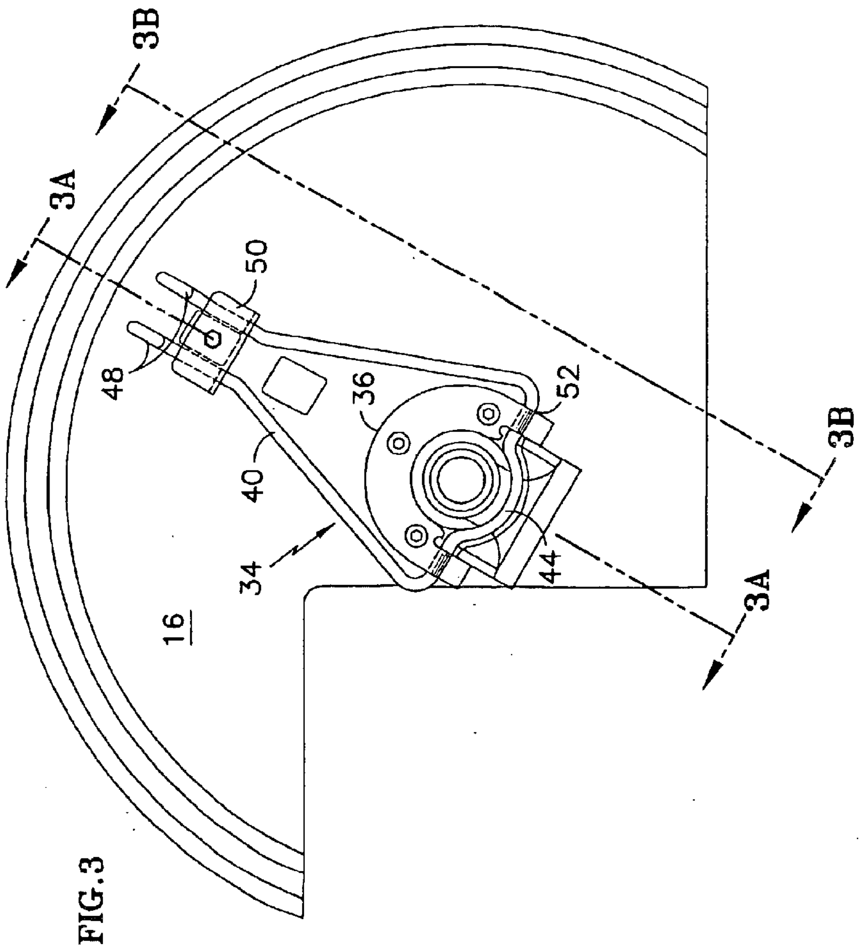
Figure 4B:
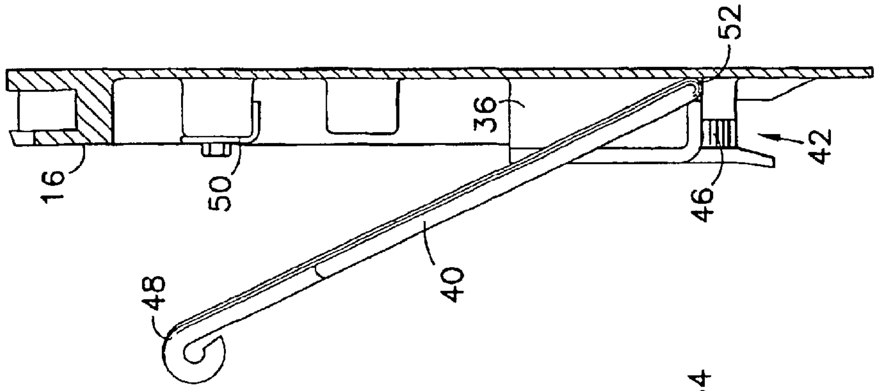
Figure 4A:
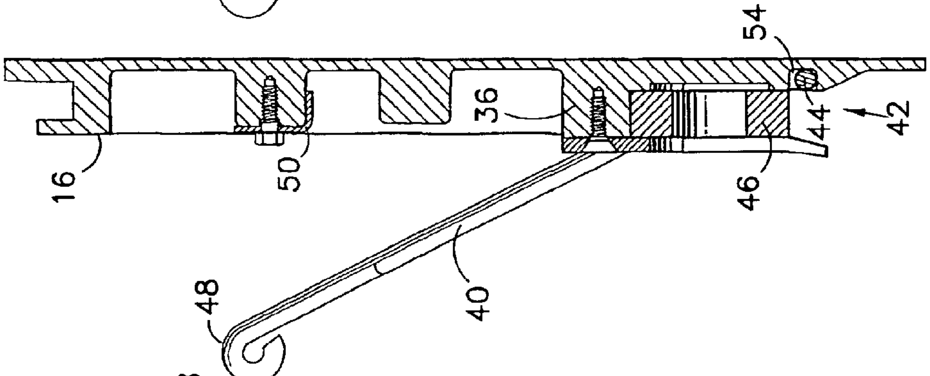
Figure 4:
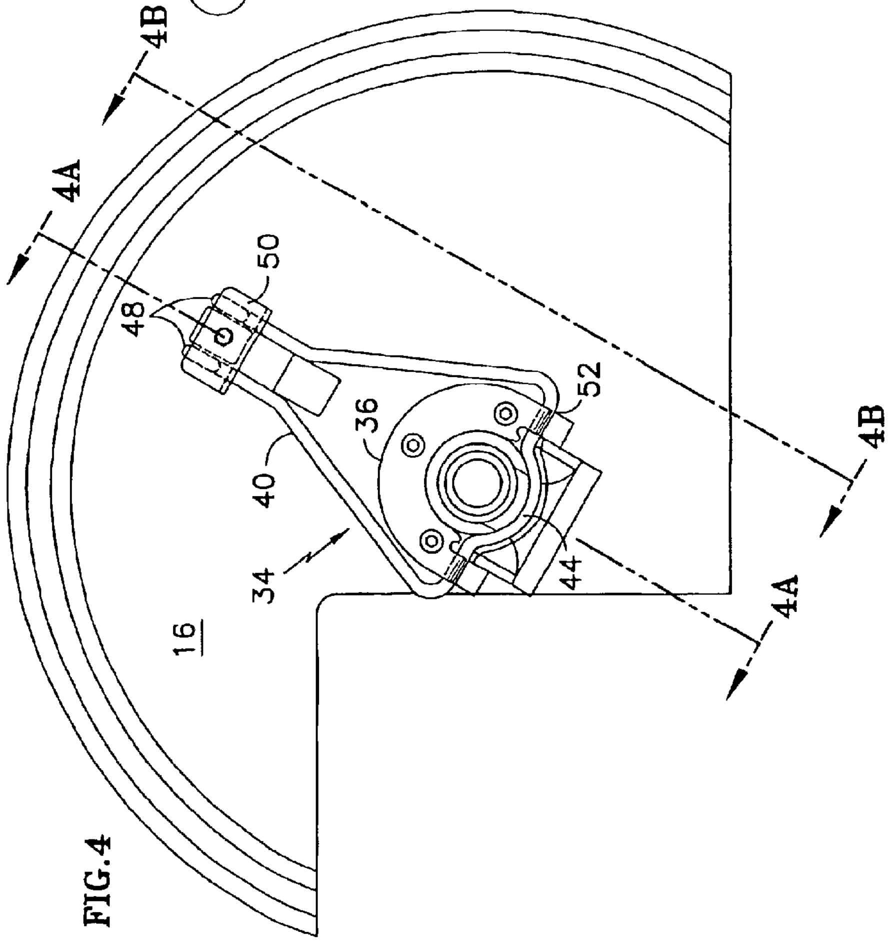
Figure 6:
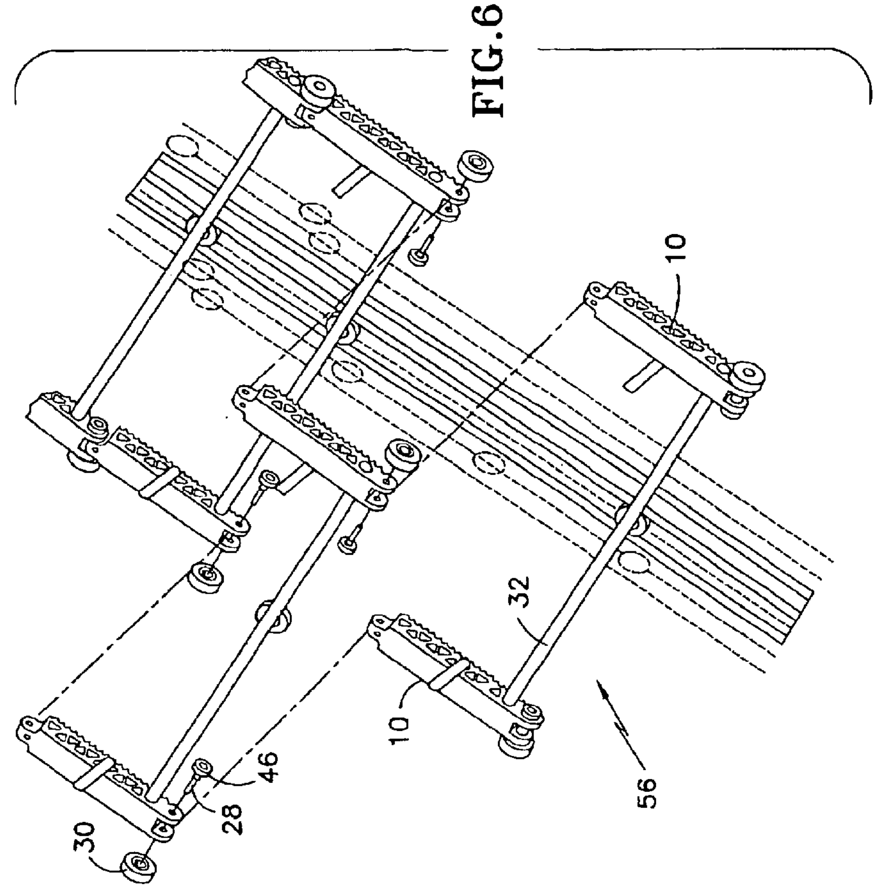
Figure 5:
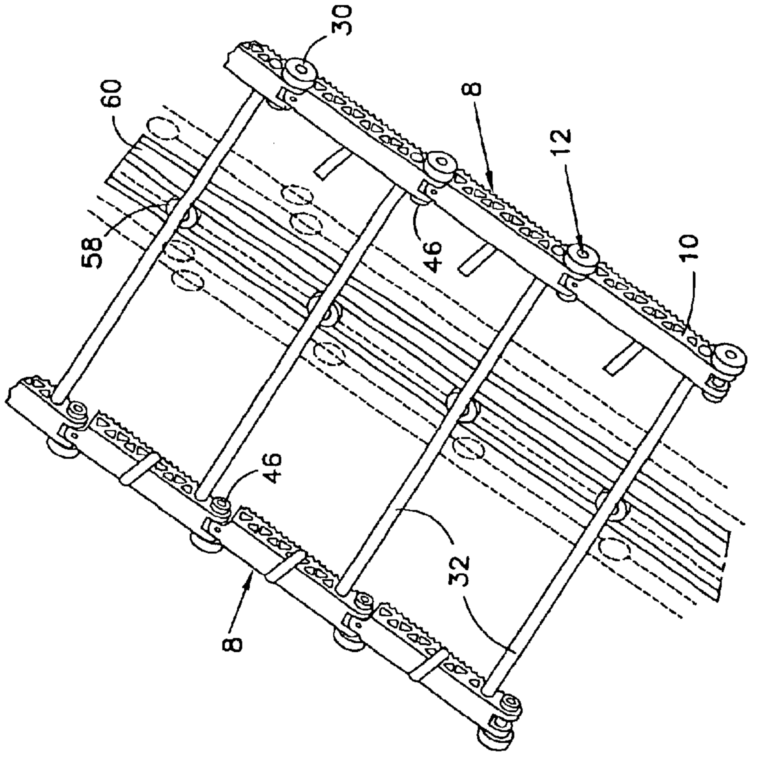

The invention and one embodiment of the invention are described in greater detail below with reference to the figures. The figures show:

FIG. 1, part of a passenger conveyor according to the invention;

FIG. 2, an enlarged perspective representation of a lateral holding device of a passenger conveyor according to the invention;

FIG. 3, a side view of a lateral holding device with the holding spring in the locked state;

FIG. 3A, a section along the line A—A in FIG. 3;

FIG. 3B, a section along the line B—B in FIG. 3;

FIG. 4, a side view of a lateral holding device with the holding spring in the unlocked state;

FIG. 4A, a section along the line A—A in FIG. 4;

FIG. 4B, a section along the line B—B in FIG. 4;

FIG. 5, a detail of the stair chain arrangement of a passenger conveyor according to the invention; and FIG. 6, the stair chain arrangement according to FIG. 5 in the form of an exploded view.

FIG. 1 shows a passenger conveyor 2 with an endless passenger conveyor belt 6 that is composed of several interconnected footboard elements 4. The footboard elements 4 are connected to transport chains 8 that are respectively arranged laterally of the footboard elements and consist of a series of chain links 10. The chain links 10 are connected to one another at pivots 12. The passenger conveyor 2 is driven by a (not-shown) linear drive of the type that contains an endless revolving drive belt with a toothing. The toothing of the drive belt meshes with the toothing 14 of the chain links 10.

One of the footboard elements 4 is removed from the passenger conveyor belt 6. The footboard element 4 contains lateral flange elements 16 that move together with the footboard element 4. The flange elements 16 are rigidly fastened on the footboard element, wherein a second type of flange element 18 is respectively arranged between two flange elements 16. A cover (not-shown) follows the balustrade toward the top from the flange elements 16, 18 of the footboard elements 4.

The footboard elements 4 are moved in a revolving fashion by the transport chains 8. Stair rollers 22 arranged on arms 20 serve for controlling the position of the stepping surface or step 24 of the footboard element 4. The stair roller 22 is guided in a guideway (not-shown). The guideway follows a predetermined curve for the step wheel 22 such that the position of each footboard element 4 is defined in a compulsory fashion.

The shown passenger conveyor 2 consists of an escalator. In escalators, the passenger conveyor belt 6 is referred to as a stair belt, and the footboard elements 4 are referred to as stair bodies. As mentioned above, one stair body 4 contains a stepping surface 24 that is also referred to as the step and a stair front side 26 that is also referred to as the riser.

The individual chain links 10 of the transport chains 8 are connected at the pivots 12 by means of short axle bolts 28. Chain wheels 30 are rotatably arranged on the outside of the axle bolts 28.

Two chain links 10 of the left and the right stair chains 8 which are identically arranged relative to the footboard element 4 are rigidly connected to one another by means of a connecting axle 32. The connecting axle 32 does not protrude outward beyond the chain links 10. In the enlarged detail shown in FIG. 2, one can more clearly ascertain the lateral holding device 34, by means of which a footboard element 4 is connected to the transport chain 8. This figure shows, in particular, a pocket-like receptacle element 36, in which a stub-like extension of the engaging bolt 28 is fixed. A holding spring 40 forms a locking device 38 that accommodates the free end of the engaging bolt 28.

FIGS. 3, 3A and 3B show the lateral holding device 34 with the holding spring 40 in the locked position. The section according to FIG. 3A, in particular, shows the pocket-like receptacle element 36 that is open toward the bottom. In the embodiment shown, the receptacle element 36 is fastened on the flange element 16. However, it may also be fastened on the footboard element 4. Insertion bevels that simplify the insertion of the engaging element into the receptacle device 36 are arranged in the region of the bottom opening 42 of the receptacle element 36. This figure also shows the lower end 44 of the holding spring 40 which closes this bottom opening 42. The section according to FIG. 3A also shows the pivot bearing 46, the outer race of which fits into the receptacle device 36. The lower end 44 of the holding spring 40 presses the outer race of the pivot bearing 46, which is also referred to as a stair bearing, into the receptacle of the receptacle device 36. The upper free ends 48 of the holding spring 40 are respectively fixed behind a holding bracket 50. FIG. 2, in particular, shows that the maintenance personnel are able to take hold of the two free ends 48 of the spring relatively easily and to move said free ends out of the holding brackets 50 by compressing the two springs. FIG. 3 shows how the lower end 44 of the holding spring encompasses the outer race of the stair bearing 46. The spring 40 is supported on the receptacle element 36 in a pivoted fashion at 52.

FIG. 4 shows how the holding spring 40 is pivoted away from the footboard element 4 about the pivot bearing 52. FIG. 4A, in particular, shows that a recess 54 is arranged in the receptacle device 36, wherein the lower end 44 of the holding spring 40 is lowered into the aforementioned recess due to the pivoting of the holding spring 40. This means that the bottom opening 42 is now open in order to remove the step bearing from the receptacle element 36 and thusly detach the entire footboard element 4 from the transport chain 8.

A comparison between FIG. 2 and FIG. 3 or 4 indicates that the holding spring 44 may be constructed differently. One particular advantage of the holding spring 40 can also be seen in the fact that it is relatively simple to reliably determine whether the holding spring 40 fulfills its function or not. One can generally assume that the holding spring 40 fulfills its function if its two free ends 48 are fixed behind the holding brackets 50. If they are not fixed in this fashion, the prestress of the spring causes the free end(s) 48 of the holding spring 40 to pivot outward. The position of the free ends 48 of the holding spring 40 can be monitored with the aid of a simple optical, mechanical or electronic monitoring device. Such a sensor may be connected to the control of the passenger conveyor and arranged thereon in such a way that it checks each free end 48 of the holding springs 40 on one side of the footboard element belt 6 once during each revolution of the footboard element belt 6.

The engaging element that cooperates with the receptacle element 36 does not necessarily have to be arranged on the pivot 12 between two chain links 10. It would also be conceivable to conventionally arrange a continuous connecting axle at the pivot 12 and to arrange the engaging element of the lateral holding device on a chain link 10 in the region between the two pivots 12 of the chain links 10. The engaging element does not necessarily have to be constructed in the form of a bolt. It may also have the shape of an engaging lug that engages into the receptacle element 36. It would also be possible to arrange the receptacle element 36 on a chain link 10 and the engaging element on a footboard element 4. Different locking devices 38 may be provided instead of the holding spring 40. For example, it would be possible to provide a screw connection, a rapid-action coupling or another suitable connection. The particular advantage of the described embodiment can be seen in the fact that the individual footboard elements 4 can be easily removed from the conveyor belt 6 without the assistance of tools after the covers in the region of the balustrade are removed. Another significant advantage can be seen in the fact that no loose parts exist. Consequently, it is ensured that neither tools nor loose parts can accidentally fall into the system and cause damage.

FIG. 5 shows the transport chain arrangement consisting of two lateral transport chains 8 that are connected to one another by means of connecting axles 32. This means that the transport chain arrangement has a ladder-like configuration. FIG. 6, in particular, shows that the transport chain arrangement is composed of a series of transport chain segments 56, wherein each individual transport chain segment 56 contains two chain links 10 and the continuous connecting axle 32. Successively arranged transport chain segments 56 are connected to one another at the pivots 12.

A guide roller 58 that is guided in a guide rail 60 is fastened on the continuous connecting axle 32 between two chain links 10. In the embodiment shown, the guide rail 60 essentially has a U-shaped cross section, wherein the distance between the two limbs of the U is slightly larger than the diameter of the guide roller 58. The guide roller advantageously has a running surface or a running surface region that consists of an elastic material so as to prevent excessively stressful impulses from being introduced into the conveyor belt 6. It should be noted that the guide roller 58 changes its rotating direction when it moves from one limb of the U-shaped guideway 60 to the other limb. A guidance without essentially any play can be constructed if two guide rollers 58 that form a gap between their running surfaces are arranged adjacent to one another on the connecting axle 32, wherein said guide rollers cooperate with a web that stands on edge and extends in the gap in the direction thereof.

The exploded view according to FIG. 6 indicates the few different parts of which the transport chain arrangement of the passenger conveyor according to the invention is composed. Individual chain links 10 are connected to one another by means of engaging bolts 28 at intermeshing end regions, wherein said engaging bolt carries the chain roller 30 on its outer free end and the pivot bearing or stair bearing 46 on its inner free end. The connecting axle 32 is preferably arranged in a region situated relatively near the pivot bearing such that a relatively large free cross section, through which the repair personnel gains access to the interior of the system, is only created when a step is detached.

The ratio between the partition of the transport chain and the partition of the conveyor belt is 1:1, i.e., one footboard element 4 is fastened to each chain link 10 or each transport chain segment 56, respectively.

FIG. 1 makes it clear how much the detachment has been simplified at any point of the transport path in the passenger conveyor 2 according to the invention. In the first step, the cover in the region of the balustrade or the balustrade paneling, respectively, is removed in the relevant region. In the next step, the flange element 18 as well as the stair roller 22 that is easily accessible on the holding arm 20 are removed in the embodiment shown. The holding springs 40 are then unlocked from the lateral holding device 37 [sic; 34] and pivoted into a disengaged position. The footboard element 4 can now be easily removed from the conveyor belt 6. An arbitrary number of additional footboard elements can be removed analogously. If it is, for example, also required to remove or replace a stair bearing 46 or a complete transport chain segment 56, the connecting bolt 28 between two chain links 10 is removed by means of a suitable puller or another tool. In this case, the chain roller 30 needs to be removed from the free end of the bolt 28. Once the chain roller 30 is removed on both sides of a corresponding chain segment, this chain segment 56 is no longer guided by the guideways for the chain rollers 30 and can be easily detached after removing the additional bolts 28. The passenger conveyor can be completely disassembled and subsequently reassembled without having to displace the conveyor belt 6. The guideway typically consists of a running rail on which the stair roller runs and a counter rail that is arranged above the stair roller and prevents the stair roller from moving upward. The running rail may, for example, be arranged on the frame of the passenger conveyor together with the guideway for the chain rollers. The counter rail can be fastened on the cover or the balustrade paneling such that the stair rollers are free to move upward after the balustrade paneling (or the cover) is removed. If the stair roller 22 is not fastened such that it protrudes outward from the arm 20 as shown in FIG. 1, but rather such that it protrudes inward, it is possible to arrange the corresponding guideway for this stair roller 22 on the cover or the balustrade paneling, respectively, namely on the inner site. When this part is removed, the guide rail for the stair roller 22 is simultaneously removed from this region. This means that the stair roller 22 becomes free and a footboard element 4 can be detached without having to remove the stair roller 22 from the arm 20.

Covers or balustrade panels, respectively, are frequently manufactured from an extruded material, for example, aluminum or an aluminum alloy. It would be relatively simple to integrally manufacture the guideways during the extrusion of these parts. Alternatively, they may also be manufactured separately and attached thereon by means of welding or other separable or inseparable fastening arrangements.

What is claimed is:

1. Passenger conveyor containing an endless passenger conveyor belt that is composed of several interconnected footboard elements, wherein the footboard elements are respectively connected to transport chains that are arranged laterally of the footboard elements and driven around a first and a second reversing point by means of a drive, wherein the transport chains are connected to one another by means of a connecting axle, characterized by the fact that the footboard elements are detachably connected to the transport chains by means of one respective lateral holding device, of which the connecting axle is not a part.

2. Passenger conveyor according to claim 1, characterized by the fact that the lateral holding device is comprised of a fastener that is movable between a locked state and an unlocked state by manipulation of a spring.

3. Passenger conveyor according to claim 2, characterized by the fact that the spring of the fastener is a holding spring.

4. Passenger conveyor according to claim 1, characterized by the fact that the holding device contains a pocket-like receptacle element, an engaging element that is designed for being accommodated in the receptacle element and a locking device that fixes the engaging element in the receptacle element.

5. Passenger conveyor according to claim 4, characterized by the fact that the engaging element is comprised of an engaging bolt with a thickening on its free end.

6. Passenger conveyor according to claim 5, characterized by the fact that the thickening on the free end of the engaging bolt is comprised of a pivot bearing.

7. Passenger conveyor according to claim 4, characterized by the fact that the pocket-like receptacle element is arranged on the footboard element and the engaging element is arranged on the transport chain.

8. Passenger conveyor according to claim 7, characterized by the fact that the passenger conveyor is comprised of an escalator with a stair belt, wherein the stairs of the stair belt respectively contain one step and one riser, and wherein the receptacle element is arranged proximal to a lateral edge of the riser.

9. Passenger conveyor according to claim 7, characterized by the fact that the transport chains are composed of a series of chain links that are connected to one another at pivots, and by the fact that the engaging bolt is arranged on a pivot.

10. Passenger conveyor according to claim 4, characterized by the fact that the locking device is comprised of a holding spring.

11. Passenger conveyor according to claim 10, characterized by the fact that the holding spring is rotatably fastened on the receptacle element in such a way that two free ends of the holding spring essentially protrude upward and away from the transport chain in the installed state.

12. Passenger conveyor according to claim 1, characterized by the fact that the passenger conveyor is comprised of an escalator in which the stair position is controlled by means of a stair roller in the passenger conveying region, wherein the stair roller is guided above the stair chain in a guideway.

13. Passenger conveyor according to claim 12, characterized by the fact that the guideway is removable when detaching the footboard elements.

14. Passenger conveyor according to claim 1, characterized by the fact that the transport chains are composed of a series of chain links that are connected to one another at pivots, wherein the partition ratio between the transport chain and the passenger conveyor belt is 1:1, and by the fact that two chain links of the transport chains which are identically positioned relative to a footboard element are connected to one another laterally of this footboard element by means of a continuous connecting axle that is rigidly fastened on the chain links between the two pivots.

15. Passenger conveyor according to claim 12, characterized by the fact that the guideway is removed when detaching the footboard elements.

16. Passenger conveyor according to one of claim 1, characterized by the fact that the lateral holding device is comprised of a fastener that is movable between a locked state and an unlocked state by manipulation thereof at a location that is upward of the transport chains.

17. Passenger conveyor according to claim 1, characterized by the fact that the lateral holding device is comprised of a fastener that is movable between a locked state and an unlocked state by manipulation thereof at a location that is outside of lateral edges of a step of the footboard elements.

18. Passenger conveyor according to claim 1, characterized by the fact that the lateral holding device is comprised of a fastener that is movable between a locked state and an unlocked state by manipulation thereof at a location that is upward of the transport chains and outside of lateral edges of a step of the footboard elements.

* * * * *